United States Patent
Kim et al.

(10) Patent No.: US 10,623,078 B2
(45) Date of Patent: Apr. 14, 2020

(54) METHOD FOR DATA COMMUNICATIONS USING MULTI-BEAMFORMING IN MOBILE COMMUNICATION SYSTEM AND APPARATUS THEREFOR

(71) Applicant: ELECTRONICS AND TELECOMMUNICATIONS RESEARCH INSTITUTE, Daejeon (KR)

(72) Inventors: Min Hyun Kim, Busan (KR); Ji Hyung Kim, Daejeon (KR); Ju Ho Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/059,790

(22) Filed: Aug. 9, 2018

(65) Prior Publication Data
US 2019/0052330 A1  Feb. 14, 2019

(30) Foreign Application Priority Data

| Aug. 11, 2017 | (KR) | .................. | 10-2017-0102625 |
| Aug. 18, 2017 | (KR) | .................. | 10-2017-0104582 |
| Jul. 9, 2018 | (KR) | .................. | 10-2018-0079480 |

(51) Int. Cl.
| H04B 7/02 | (2018.01) |
| H04B 7/06 | (2006.01) |
| H04W 72/12 | (2009.01) |
| H04L 5/00 | (2006.01) |

(52) U.S. Cl.
CPC .......... *H04B 7/0617* (2013.01); *H04B 7/063* (2013.01); *H04B 7/0626* (2013.01); *H04B 7/0632* (2013.01); *H04B 7/0639* (2013.01); *H04B 7/0695* (2013.01); *H04L 5/0053* (2013.01); *H04W 72/1231* (2013.01); *H04L 5/0048* (2013.01)

(58) Field of Classification Search
CPC .. H04B 7/0617; H04B 7/0695; H04B 7/0626; H04B 7/0632; H04B 7/063; H04B 7/0639; H04L 5/0053; H04W 72/1231
See application file for complete search history.

(56) References Cited

U.S. PATENT DOCUMENTS

| 9,231,745 | B2 | 1/2016 | Lee et al. |
| 9,385,852 | B2 | 7/2016 | Hammarwall |
| 9,571,247 | B2 | 2/2017 | Xiong et al. |
| 2012/0182895 | A1 | 7/2012 | Jwa |

(Continued)

*Primary Examiner* — Siu M Lee
(74) *Attorney, Agent, or Firm* — Rabin & Berdo, P.C.

(57) ABSTRACT

Disclosed is an operation method of a base station in a mobile communication system. The operation method may comprise performing a beam management procedure for selecting at least one beam and transmitting a different channel state information reference signal (CSI-RS) for each beam to a terminal through the at least one beam; receiving a beam quality information for the at least one beam from the terminal; transmitting at least one CSI-RS for CSI acquisition configured according a beam management update procedure based on the beam quality information to the terminal through at least one beam; and receiving a CSI based the CSI-RS for CSI acquisition from the terminal.

18 Claims, 5 Drawing Sheets

(56) References Cited

U.S. PATENT DOCUMENTS

| | | |
|---|---|---|
| 2015/0288499 A1 | 10/2015 | Nam et al. |
| 2016/0191201 A1 | 6/2016 | Park et al. |
| 2016/0337993 A1* | 11/2016 | Takeda .................. H04L 5/0048 |
| 2017/0033912 A1 | 2/2017 | Onggosanusi et al. |
| 2017/0047978 A1 | 2/2017 | Kim et al. |
| 2018/0115990 A1* | 4/2018 | Abedini ............... H04W 74/006 |
| 2018/0205585 A1* | 7/2018 | Sadiq .................... H04L 5/0023 |
| 2018/0227031 A1* | 8/2018 | Guo ..................... H04B 7/0626 |
| 2018/0269947 A1* | 9/2018 | Levitsky .............. H04B 7/0695 |
| 2018/0278392 A1* | 9/2018 | Onggosanusi ........ H04L 5/0048 |
| 2018/0367358 A1* | 12/2018 | Baligh ................. H04B 7/0626 |
| 2018/0368142 A1* | 12/2018 | Liou ................. H04W 72/0446 |
| 2018/0368205 A1* | 12/2018 | Park ..................... H04L 5/0048 |
| 2019/0020454 A1* | 1/2019 | Kim ....................... H04L 5/0048 |
| 2019/0037426 A1* | 1/2019 | Yu ......................... H04L 5/0048 |
| 2019/0053072 A1* | 2/2019 | Kundargi ............. H04B 7/0814 |
| 2019/0058517 A1* | 2/2019 | Kang ....................... H04B 7/06 |

\* cited by examiner

METHOD FOR DATA COMMUNICATIONS USING MULTI-BEAMFORMING IN MOBILE COMMUNICATION SYSTEM AND APPARATUS THEREFOR

CROSS-REFERENCE TO RELATED APPLICATIONS

This application claims priorities to Korean Patent Applications No. 10-2017-0102625 filed on Aug. 11, 2017, No. 10-2017-0104582 filed on Aug. 18, 2017, and No. 10-2018-0079480 filed on Jul. 9, 2018 in the Korean Intellectual Property Office (KIPO), the entire contents of which are hereby incorporated by reference.

BACKGROUND

1. Technical Field

The present disclosure relates to a method and an apparatus for data communications using multi-beamforming in a mobile communication system, and more specifically, to a method and an apparatus for data communications through interoperation of a channel state information (CSI) acquisition procedure and a beam management procedure in a multiple beamforming mobile communication system.

2. Related Art

A fifth generation (5G) mobile communication aiming at giga bps (Gbps) class support of at least 10 to 100 times data transmission rate than a fourth generation (4G) mobile communication may use not only existing mobile communication frequency bands but also several tens giga Hertz (Ghz) frequency band. For example, implementation is being discussed in 20 GHz to 60 GHz frequency bands (the wavelength at 30 GHz is 10 mm). The fifth generation mobile communication technology may also be referred to as a millimeter wave mobile communication technology since the wavelengths in frequency bands higher or lower than the frequency of 30 GHz are also expressed in millimeters.

The fifth generation mobile communication system aims at broadband bandwidth support from 5 MHz to 400 MHz, unlike the conventional 20 MHz maximum bandwidth and the 15 kHz single subcarrier interval. As described above, since it is required to support various frequency bandwidths in various frequency bands for the fifth generation mobile communication system, a cell coverage when a frequency band of several tens of GHz is used as a carrier frequency band may be much smaller than that in the conventional mobile communication system. Therefore, a method of expanding the cell coverage using multi-beamforming instead of a conventional single beamforming is being actively studied. The multi-beamforming may refer to a multi-antenna technique for transmitting and receiving signals using beams having a plurality of different directivities for covering an entire cell.

Meanwhile, in the case of using the multi-beamforming, a beam management procedure including beam quality measurement and a channel state information (CSI) acquisition procedure between a base station and a terminal are independent processes. However, these procedures have a common point in that they are procedures for acquiring information necessary for determining a beam to be used for forming a radio link. Therefore, if the beam management procedure and the CSI acquisition procedure are performed independently, a related signaling overhead and a radio resource waste may be caused.

SUMMARY

Accordingly, embodiments of the present disclosure provide an operation method of a base station that facilitates effective radio resource management and reduces signaling overhead in a mobile communication system using multi-beamforming.

Accordingly, embodiments of the present disclosure also provide an operation method of a terminal that facilitates effective radio resource management and reduces signaling overhead in a mobile communication system using multi-beamforming.

Accordingly, embodiments of the present disclosure also provide a terminal that facilitates effective radio resource management and reduces signaling overhead in a mobile communication system using multi-beamforming.

In order to achieve the objective of the present disclosure, an operation method of a base station in a mobile communication system may comprise performing a beam management procedure for selecting at least one beam and transmitting a different channel state information reference signal (CSI-RS) for each beam to a terminal through the at least one beam; receiving a beam quality information for the at least one beam from the terminal; transmitting at least one CSI-RS for CSI acquisition configured according a beam management update procedure based on the beam quality information to the terminal through at least one beam; and receiving a CSI based on the CSI-RS for CSI acquisition from the terminal.

The operation method may further comprise performing scheduling for transmission of data to the terminal based on the CSI.

At least one of a signal pattern of the at least one CSI-RS, a number of resources for the at least one CSI-RS, and information on at least one antenna port per CSI-RS resource may be configured through a higher layer control information of the base station.

Each of the at least one beam may be a cell-specific beam or a user equipment (UE) specific beam.

The beam quality information may include at least one of a CSI-RS resource indicator (CRI), a precoding matrix indicator (PMI), a rank indicator (RI), a channel quality indicator (CQI), and a reference signal received power (RSRP) for the at least one CSI-RS.

A number of antenna ports used for a CSI-RS resource used in the beam management procedure may be equal to or greater than a number of antenna ports used for a CSI-RS resource used for the CSI acquisition.

The operation method may further comprise transmitting a spatial quasi-co-location (QCL) information to the terminal, when the CSI-RS of the beam management procedure and the CSI-RS for CSI acquisition have a same spatial characteristic.

The performing of the beam management procedure and the receiving of the CSI may be performed in one of a periodical manner, a non-periodical manner, and a semi-persistent manner.

The receiving of the CSI may comprise a first CSI acquisition procedure and a second CSI acquisition procedure, each of which is performed according to a same cycle or according to a different cycle.

The CSI may include at least one of a rank indicator (RI), a precoder matrix indicator (PMI), and a channel-quality indicator (CQI).

In order to achieve the objective of the present disclosure, an operation method of a terminal in a mobile communication system may comprise receiving at least one channel state information reference signal (CSI-RS) from a base station through at least one beam selected through a beam management procedure of the base station; transmitting to the base station a beam quality information based on the at least one CSI-RS received from the base station; receiving from the terminal at least one CSI-RS for CSI acquisition configured based on the beam quality information; and transmitting a CSI based on the at least one CSI-RS for CSI acquisition to the base station.

At least one of a signal pattern of the at least one CSI-RS, a number of resources for the at least one CSI-RS, and information on at least one antenna port per CSI-RS resource may be configured through a higher layer control information of the base station.

The beam quality information may include at least one of a CSI-RS resource indicator (CRI), a precoding matrix indicator (PMI), a rank indicator (RI), a channel quality indicator (CQI), and a reference signal received power (RSRP) for the at least one CSI-RS.

A number of antenna ports used for a CSI-RS resource used in the beam management procedure is equal to or greater than a number of antenna ports used for a CSI-RS resource used for the CSI acquisition.

The CSI may include at least one of a rank indicator (RI), a precoder matrix indicator (PMI), and a channel-quality indicator (CQI).

In order to achieve the objective of the present disclosure, a terminal in a mobile communication system may comprise at least one processor, a memory storing at least one instruction executed by the at least one processor, and a transceiver controlled by the at least one processor. Also, the at least one instruction may be configured to receive, by using the transceiver, at least one channel state information reference signal (CSI-RS) from a base station through at least one beam selected through a beam management procedure of the base station; transmit, by using the transceiver, to the base station a beam quality information based on the at least one CSI-RS received from the base station; receive, by using the transceiver, from the terminal at least one CSI-RS for CSI acquisition configured based on the beam quality information; and transmit, by using the transceiver, a CSI based on the at least one CSI-RS for CSI acquisition to the base station.

At least one of a signal pattern of the at least one CSI-RS, a number of resources for the at least one CSI-RS, and information on at least one antenna port per CSI-RS resource may be configured through a higher layer control information of the base station.

The beam quality information may include at least one of a CSI-RS resource indicator (CRI), a precoding matrix indicator (PMI), a rank indicator (RI), a channel quality indicator (CQI), and a reference signal received power (RSRP) for the at least one CSI-RS.

A number of antenna ports used for a CSI-RS resource used in the beam management procedure is equal to or greater than a number of antenna ports used for a CSI-RS resource used for the CSI acquisition.

The CSI may include at least one of a rank indicator (RI), a precoder matrix indicator (PMI), and a channel-quality indicator (CQI).

According to the embodiments of the present disclosure, in the multi-beamforming mobile communication system, it is made possible to efficiently manage radio resources and reduce signaling overhead through interoperation of the CSI acquisition procedure and the beam management procedure.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
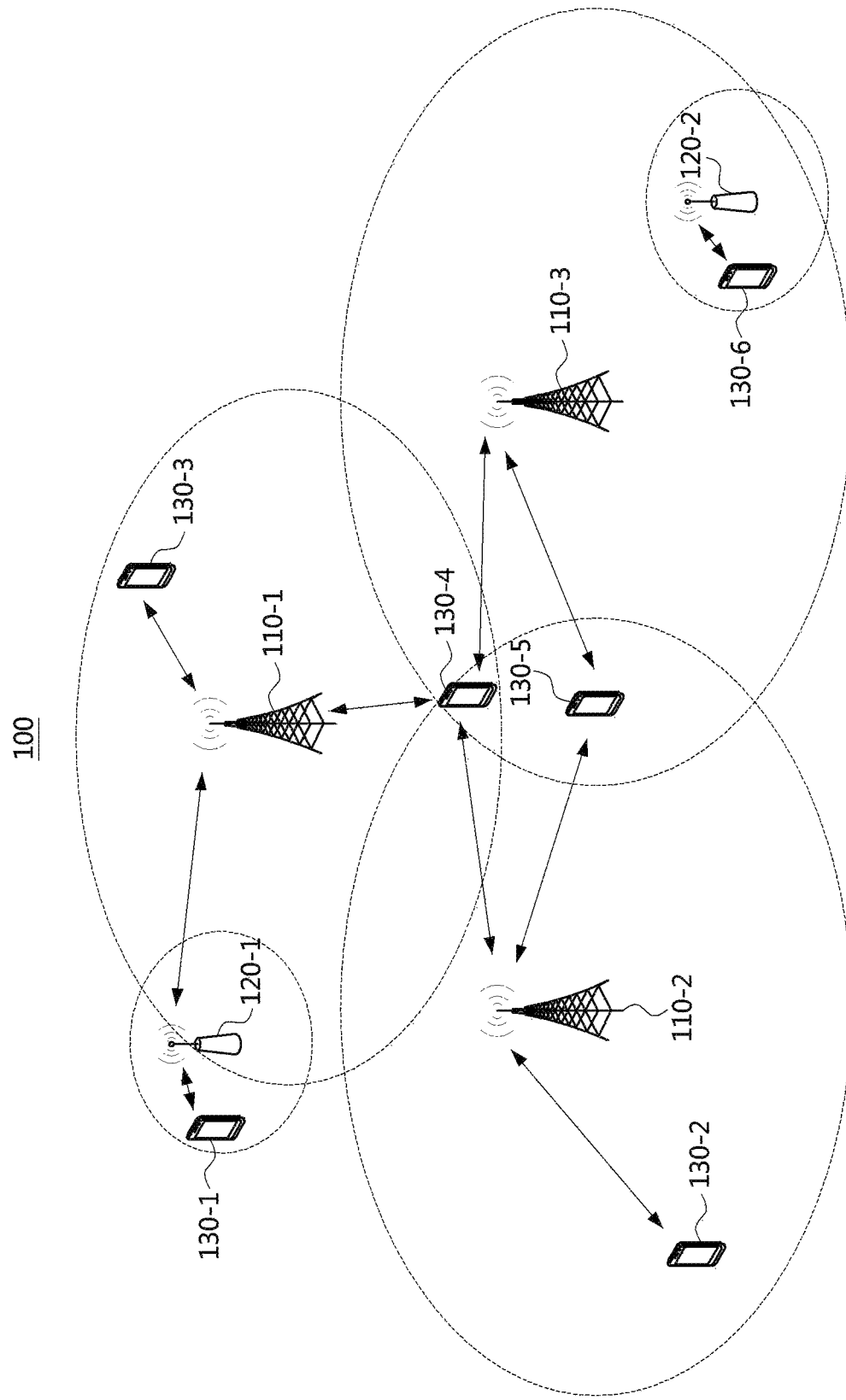
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram a wireless communication system according to a first embodiment of the present disclosure.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
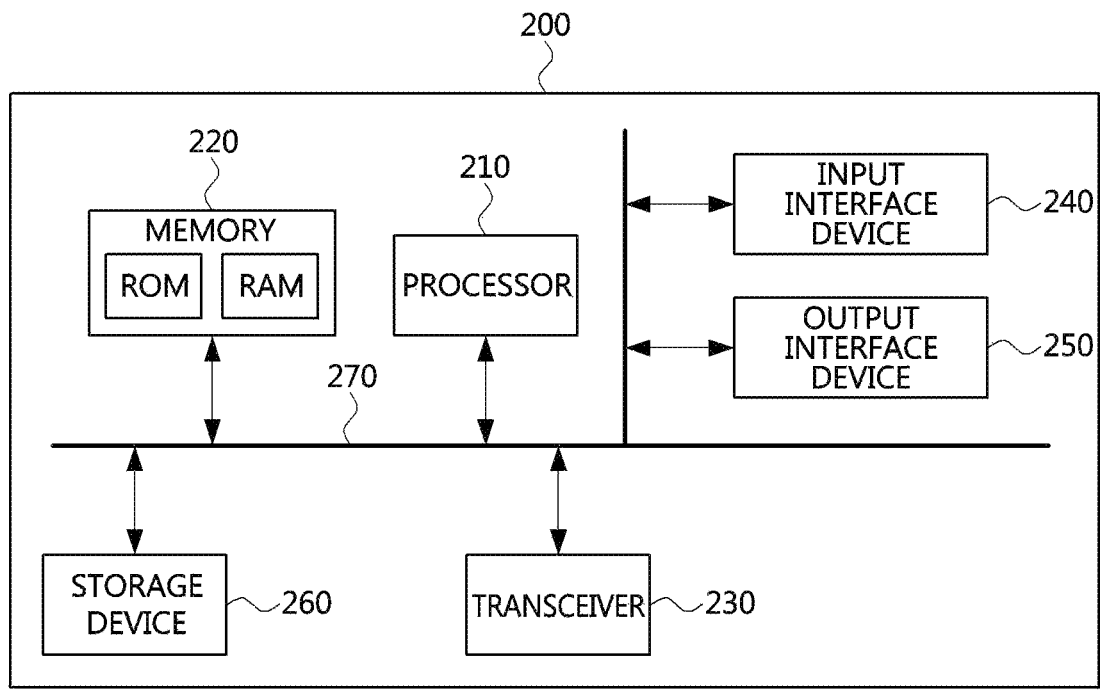
FIG. 2 is a block diagram illustrating a first embodiment of a communication node constituting a communication system.

FIG. 2 is a block diagram illustrating a communication node in a wireless communication system according to a first embodiment of the present disclosure.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, multiple beamforming techniques will be described. Here, even when a method (e.g., transmission or reception of a signal) to be performed in a first communication node among communication nodes is described, a corresponding second communication node may perform a method ((E.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 3:
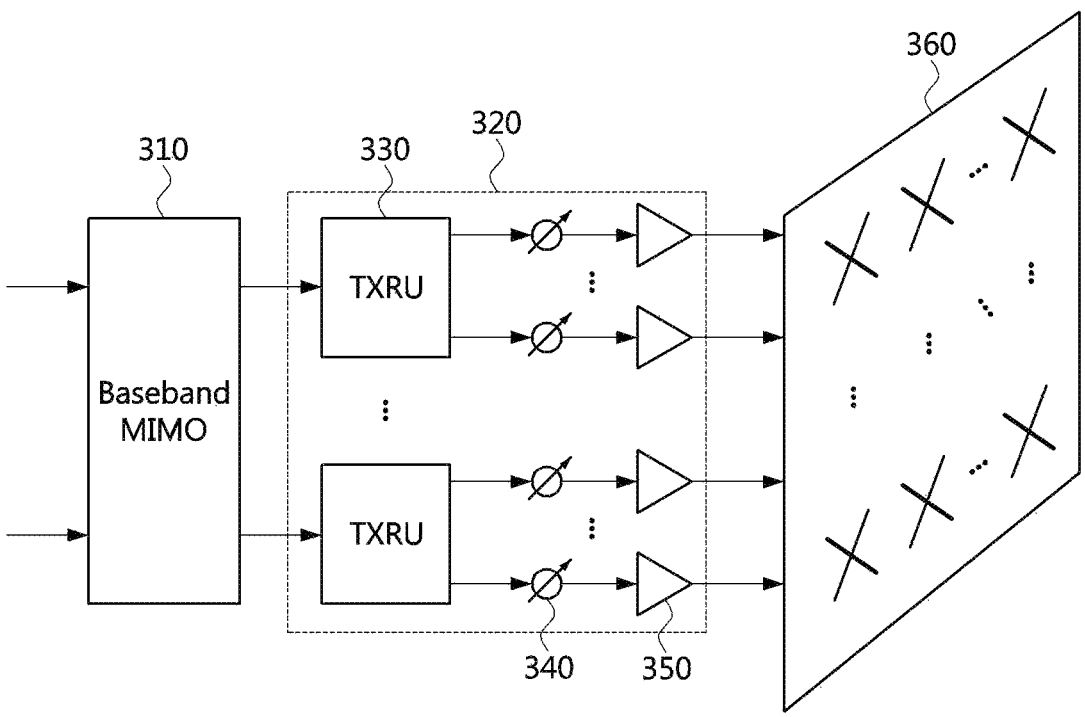
FIG. 3 is a conceptual diagram illustrating a hybrid beamforming technique in a fifth generation mobile communication system.

FIG. 3 is a conceptual diagram illustrating a hybrid beamforming technique in a fifth generation mobile communication system.

Referring to FIG. 3, a hybrid beamforming technique, one of the large capacity multi-antenna techniques used in a New Radio (NR) system which is one of the fifth generation mobile communication systems, is illustrated.

The NR system, which supports operations in a frequency band up to 100 GHz, considers beamforming techniques using the large capacity multi-antenna as a scheme for solving the problem of radio signal arrival distance which is a fundamental problem of the high frequency band communications. Such the beamforming techniques may include an analog beamforming scheme and a digital beamforming scheme.

The digital beamforming scheme uses a plurality of radio frequency (RF) paths based on multiple-input multiple-output (MIMO) antennas and a digital precoder or a codebook to achieve a beamforming gain. The digital beamforming scheme requires a digital-to-analog converter (DAC) and an analog-to-digital converter (ADC), and requires the same number of transceiver units (TXRUs) as the antenna elements. Thus, as the beamforming gain is increased, implementation complexity of the antenna may increase proportionally.

The analog beamforming scheme achieves a beamforming gain through an antenna array and a number of analog devices such as a phase shifter, a power amplifier (PA), a variable gain amplifier (VGA), and the like. In the analog beamforming scheme, since a plurality of antenna elements are connected to a single transceiver unit through a phase shifter, even if the number of antenna elements is increased to increase the beam forming gain, the implementation complexity is not greatly affected by the increased number of antenna elements. However, since the analog beamforming scheme adjusts the phase shifter in time, the frequency resource utilization efficiency is limited.

Accordingly, a hybrid beamforming scheme, which is a combination of the digital beamforming scheme and the analog beamforming scheme, may apply both of a digital signal processor 310 (corresponding to a digital beamforming part, i.e., a baseband MIMO processing part) for baseband signals and an analog beamforming part 320 including at least one phase shifter 340 and at least one amplifier 350. Also, the hybrid beam forming scheme may generate a directional beam at an RF part 360 to compensate for path attenuation, and achieve multiple input/output gains through additional beamforming in the digital domain. As a result, in order to apply the hybrid beamforming scheme, the beamforming precision and the implementation complexity should be compromised. Here, each of at least one TXRU 330 is a transceiver unit.

Meanwhile, in addition to the beamforming scheme, an important technique in multi-beamforming of the NR system is a technique for channel state information (CSI) acquisition. Since a quality of acquired CSI has a great effect on the system performance, the CSI acquisition is one of the most important parts in utilizing the multi-beamforming technique. For the CSI acquisition, reference signals (RSs) for CSI measurement and procedures for CSI reporting should be designed.

In the NR system, for the CSI measurement, a use of hybrid CSI-RS, which is a combined form of UE-specific RS and non-UE-specific RS, is also considered as well as the UE-specific RS and the non-UE-specific RS. Also, use of RSs for interference measurement and channel reciprocity measurement is being considered. In this regard, in addition to an implicit feedback scheme for reporting a channel quality indicator (CQI), a precoding matrix indicator (PMI), a precoding type indicator (PTI), a rank indicator (RI), and a CSI-RS resource indicator (CRI) in the conventional 3GPP LTE/LTE-A system, various CSI reporting schemes such as an explicit feedback reporting quantized or actual channel information, interference information feedback, or the like is being considered in the NR system.

Meanwhile, in case that cell coverage is increased through beamforming in the NR system, common control channels and common signals, which are commonly transmitted to all terminals in a cell, as well as dedicated control channels and dedicated data transmitted to each terminal in the cell, are also transmitted in a beamforming manner. However, in this case, the common control channels and the common signals including synchronization signals cannot be transmitted to the entire area of the cell through a single transmission, and the channels and the signals may be transmitted through multiple beams over a plurality of times for a predetermined time (this scheme may be referred to as 'beam sweeping'). Here, at least one beam used for transmission may be determined through the above-described CSI acquisition procedure. Also, according to necessity, the NR system may perform a beam management procedure to select and adjust transmission beams faster than the manner based on the CSI acquisition.

The beam management procedure may mean a procedure in which a base station determines and adjusts a beam to be applied to a physical channel or a signal based on beam quality information reported from a terminal. More specifically, the terminal measures qualities of a plurality of beams of the base station through reception of RSs from the base station and transmits the beam quality information to the base station, and the base station may perform the beam management procedure using the reported beam quality information. The beam quality information may be a CSI obtained through RSs or a reference signal received power (RSRP) of RSs. Also, the beam quality information may be information on at least one index of one or more beams preferred by the terminal.

The beam management procedure and the CSI acquisition procedure described above are processes defined independently of each other, and details of respective steps constituting each of the procedures, such as signaling, feedback information, CSI-RS resource configuration, and the like, are different. However, the need to acquire information needed to determine a beam used to establish a radio link and transmit the signal and the channel is common to the both procedures. Therefore, if the both procedures are performed independently, there may be a problem of overlapped CSI-RS resources and a problem of increased signaling/feedback overhead. Next, interoperation of the beam management procedure and the CSI procedure according to an embodiment of the present disclosure for solving the above-described problems will be described.

Figure 4:
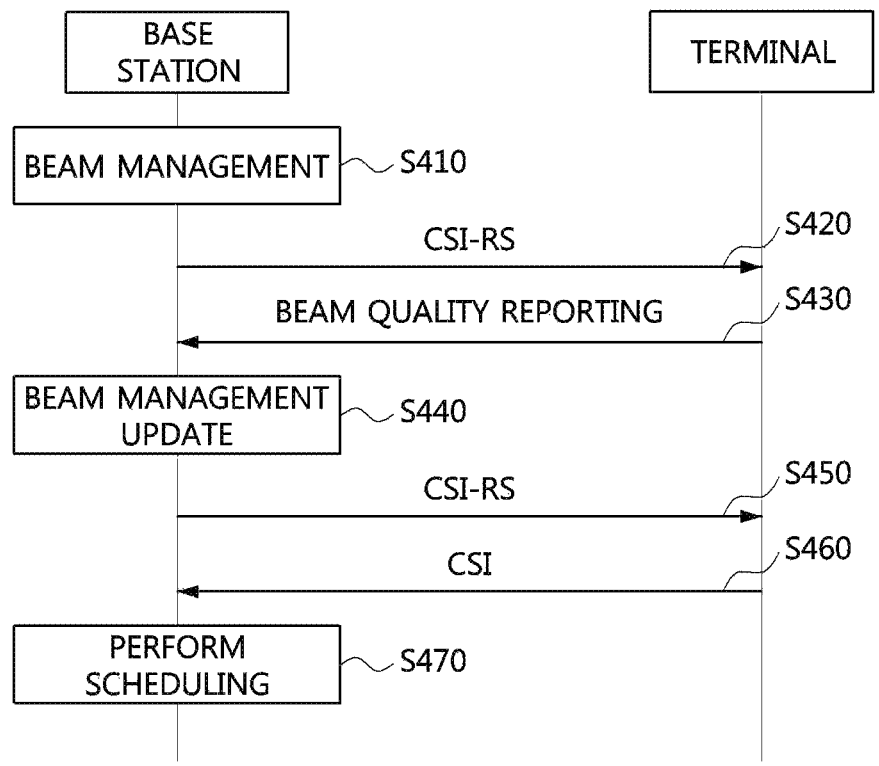
FIG. 4 is a sequence chart illustrating a procedure in which a beam management procedure is interoperated with a CSI acquisition procedure according to an embodiment of the present disclosure.

FIG. 4 is a sequence chart illustrating a procedure in which a beam management procedure is interoperated with a CSI acquisition procedure according to an embodiment of the present disclosure.

Referring to FIG. 4, it is illustrated that a beam management procedure and a CSI acquisition procedure are performed between a terminal and a base station in an integrated manner. As described above, in performing beam management in the multi-beam based mobile communication system, at least one beam to be applied to physical channels or signals are determined and adjusted based on the beam quality information reported from the terminal.

The base station may perform a beam management procedure to select and adjust one or more transmission beams and one or more reception beams (hereinafter, referred to multiple beams) forming a radio link with the terminal (S410). The base station may allocate different CSI-RSs to each of the selected multiple beams and transmit them to the terminal (S420). The at least one beam used in performing the beam management procedure may be cell-specific beam or UE-specific beam, or may be wideband beam or narrowband beam. The CSI-RS may be used to manage the beams having such the properties.

The CSI-RS is a reference signal transmitted from the base station to the terminal, and may be used by the terminal to estimate CSIs required for channel-dependent scheduling, link adaptation, and transmission configuration related to multi-antenna transmission. The pattern of CSI-RSs for each beam, the number of CSI-RS resources, and the number of antenna ports per CSI-RS resource may be configured by a higher layer of the base station, and may be transmitted to the terminal as higher layer control information.

Here, the antenna port is an abstract concept and does not necessarily correspond to a specific physical antenna. Each downlink transmission may be performed through at least one specific antenna port, and each antenna port may be identified and informed to the terminal. The terminal may also assume that if two transmission signals are transmitted from the same antenna port, they pass through the same radio channel. In the downlink, each antenna port may correspond to a specific RS. Therefore, the terminal can estimate a channel corresponding to a specific antenna port using a specific RS, and can extract detailed CSI on the channel corresponding to the specific antenna port using the specific RS.

In case that one CSI-RS resource is mapped in one beam, if $K_B$ CSI-RS resources are configured by the base station, the base station may be assumed to use $K_B$ beams for beam management. In this case, a CSI-RS resource configured for each beam may be composed of $P_{k_B=\{1,\ldots,K_B\}}$ antenna ports.

Then, the terminal may receive RSs such as the CSI-RSs transmitted through multiple beams of the base station, measure qualities of the plurality of beams of the base station, and report to the base station beam quality information such as information on at least one index of at least one beam preferred by the terminal, the CSI, and the like (S430). This may be referred to as beam quality reporting. As described above, the beam quality information may be the CSI obtained through the RS or a RSRP of the RS. Alternatively, the beam quality information may be a CRI, a wideband or narrowband PMI, an RI, a CQI, or the like.

The beam quality information may be transmitted through an uplink control channel and/or an uplink data channel of a radio link formed by the beam. Also, even if a beam is selected by the base station based on the CSI among the beam quality information, other information such as RSRP may be additionally provided according to the needs of the base station.

The CSI is provided by the terminal to the base station in order to assist the base station to perform scheduling according to the downlink channel, and the base station may make a downlink scheduling decision based on the CSI. The CSI may be composed of one or more of RI, PMI, and CQI.

The RI is a recommendation value for ranks used for transmission, and may provide information on the number of layers desired to be used for downlink transmission to the corresponding terminal. The PMI may provide information on what precoding matrices are desired to be used for downlink shared channel (DL-SCH) transmission. The CQI may refer to the highest possible modulation and coding scheme (MCS) for transmission of PDSCH that can be received with a block error rate (BLER) of less than 10% when the recommended RI and PMI are used.

The CSI reporting to the base station of the terminal may be performed through a combination of RI, PMI, and CQI. Exactly which information is included in the CSI may depend on a transmission mode configured for the terminal.

For example, RI and PMI need not be reported unless the transmission mode for the terminal is configured to a spatial multiplexing (SM) transmission mode. In an embodiment of the present disclosure, a wideband PMI ($i_1^{(B)}$), $RI^{(B)}$, and $CRI^{(B)}$) may be reported when the beam quality reporting is performed. Here, the superscript ($^{(B)}$) indicates that the information is the beam quality information. The reason for using the wideband PMI ($i_1^{(B)}$) and $RI^{(B)}$ as the beam quality information is to reduce the overhead in the CSI acquisition procedure and to perform the beamforming used in the CSI acquisition procedure in a UE-specific manner. Since the $CRI^{(B)}$ is the information for indicating the selected CSI-RS resource, it may be the beam quality information for beam selection and determination at the base station.

Meanwhile, an example of a codebook for generating PMIs used in an embodiment of the present disclosure may be as follows.

For example, a form of an entire codebook for generating PMIs used in an embodiment of the present disclosure may be $W=W_1W_2$. Here, $W_1$ may be represented as a Kronecker product of a horizontal domain vector and a vertical domain vector. Each domain vector may be based on an oversampled discrete Fourier transform (DFT) vector, and may be generally defined for a long-term wideband. Also, $W_2$ may be defined for a short-term wideband or a short-term subband depending on the base station, and a shape thereof may be defined as a selection and co-phasing matrix. The codebook $W_1$ may be expressed by Equation 1 and the codebook $W_2$ may be expressed by Equation 2.

$$W_1 = \begin{bmatrix} X_V \otimes X_H & 0 \\ 0 & X_V \otimes X_H \end{bmatrix} \quad \text{[Equation 1]}$$

$$W_2 = \begin{bmatrix} Y \\ \phi Y \end{bmatrix} \quad \text{[Equation 2]}$$

The reason of dividing the codebook into two parts is to simplify the implementation by allowing the terminal to apply different time domain filtering to the two parts when generating the PMIs. The PMI may be fed back from the terminal to the base station in a form of an index, the index corresponding to $W_1$ may be defined as $i_1(i_{1,1},i_{1,2})$, and the index corresponding to $W_2$ may be defined as $i_2$.

Another example of a form of codebook for generating PMIs is a form in which a term related to amplitude control is added to $W_2$ as well as a selection and co-phasing term, or a form in which a term $W_3$ for controlling co-phasing and amplitude between panels is added as well as $W_1$ and $W_2$ in the case of using multiple panels. However, the present disclosure is not limited to the above-described codebooks but various types of codebooks for generating PMIs may be available.

Upon receipt of the beam quality information from the terminal, the base station may perform a beam management update procedure based on the received beam quality information (S440). That is, the base station may determine, select, and adjust at least one beam to be applied to the physical channel or the signal based on the beam quality information reported from the terminal.

For example, in case of selecting $N_B$ beams by applying RSRP as the beam quality information, the $N_B$ beams may be selected by arranging measured beams in order from a beam having the maximum RSRP. Here, the $CRI^{(B)}$ may be configured to inform the CSI-RS resource positions corresponding to the selected $N_B$ beams. Alternatively, the CQI required to derive the PMI may be used to select the beams in the order of the CQI.

The base station that has performed the beam management update procedure may transmit the CSI-RSs to be used for CSI acquisition at the terminal to the terminal by varying beams (S450). As described above, the CSI-RS is a reference signal transmitted from the base station to the terminal, and after receiving the CSI-RS, the terminal may estimate CSI needed for channel-dependent scheduling, link adaptation, configuration of multi-antenna transmission, or the like.

Meanwhile, the cell-specific RS (CRS) may be also used to acquire the CSI, but the CSI-RS may be used to allow the terminal to acquire CSI for at least eight antenna ports, unlike the CRS. In an initial version of the 3GPP LTE/LTE-A mobile communication system, both of a function of detailed channel estimation required to perform coherent demodulation for different downlink transmissions, and a function of acquiring CSI for downlink link adaptation and scheduling have been performed based on the CRS.

However, in this case, the CRSs should be transmitted very tightly in the time and frequency domain, so that the channel estimation required for coherent demodulation can be performed even for very rapidly changing channels. Also, in order to enable the terminals to acquire the CSI in accordance with a predetermined period, it is required to be always transmitted in all subframes regardless of whether there is data to be transmitted. For these reasons, the CRS cannot use beamforming toward a specific terminal and should be transmitted in the entire cell area.

On the other hand, the CSI-RS can be configured in a UE-specific manner. The number of CSI-RSs and the CSI-RS configuration defining a detailed pattern of the CSI-RSs used by a specific terminal may be given for each terminal. Also, the CSI-RS may be configured identically for a certain group of terminals or all terminals in a cell, which means that all terminals can use the same CSI-RSs to acquire CSI in the cell. That is, both the beam management procedure and the CSI acquisition procedure according to an embodiment of the present disclosure may be performed through the CSI-RS. In this case, the respective CSI-RS configurations for the beam management procedure and the CSI acquisition procedure may be different. Also, in case that demodulation reference signals (DM-RSs) for channel estimation of a terminal are used together with the CSI-RS for CSI acquisition of the terminal, since the DM-RSs can also be transmitted only when there is data to be transmitted, appropriate beamforming can be used.

The terminal having received the CSI-RS from the base station may transmit CSI, which represents a state of a radio channel, to the base station (S460). Specifically, the terminal may estimate the channel state based on the CSI-RS and transmit CSIs such as subband PMIs ($i_1^{(c)}$, $i_2^{(c)}$), CQI, $RI^{(c)}$, and $CRI^{(c)}$. Here, the superscript ($^{(c)}$) may indicate that the corresponding information is CSI report information different from the above-described beam quality information. The procedure, in which the base station having performed the beam management update procedure transmits the CSI-RS to the terminal, and the terminal having received the CSI-RS transmits the measured CSI to the base station, may be referred to as the CSI acquisition procedure. The CSI-RS transmitted by the base station in the CSI acquisition procedure may be different from the CSI-RS transmitted by the base station in the above-described beam management procedure. The base station may receive the CSI from the terminal, and then perform scheduling for data transmission (S470).

Meanwhile, in case that the CSI-RS in the beam management procedure and the CSI-RS in the CSI acquisition procedure are transmitted to the terminal with the same or similar spatial characteristics, or transmitted to the terminal through the same terminal reception beam, the base station may configure spatial quasi-co-location (QCL) information, and transmit it to the terminal.

The QCL information may be an essential element for antenna port configuration. Upon receipt of the CSI-RS for CSI acquisition, the terminal having received the QCL information may assume the same reception spatial correlation or the same reception beam between the beam management procedure and the CSI acquisition procedure. The QCL may be configured for a single beam, or for multiple beams. Next, a description will be made of a specific operation procedure for interoperation of the beam management procedure and the CSI acquisition procedure according to an embodiment of the present disclosure.

Figure 5:
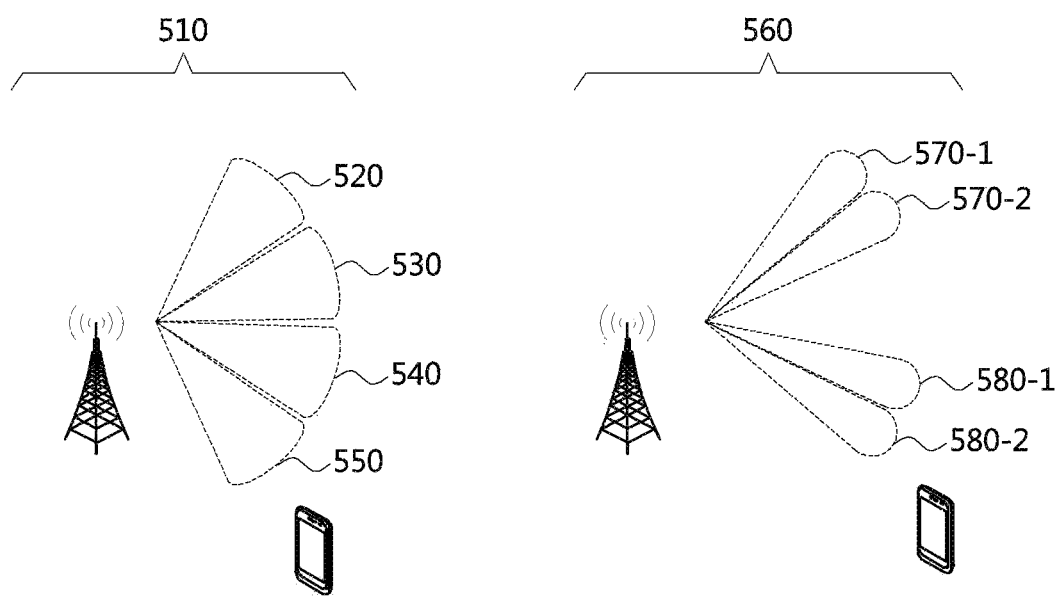
FIG. 5 is a conceptual diagram illustrating interoperation of a beam management procedure and a CSI acquisition procedure according to an embodiment of the present disclosure.

FIG. 5 is a conceptual diagram illustrating interoperation of a beam management procedure and a CSI acquisition procedure according to an embodiment of the present disclosure.

Referring to FIG. 5, in case a specific CSI-RS resource is selected through the beam management procedure, a CSI-RS resource for CSI acquisition may be configured using the specific CSI-RS resource by the base station. More specifically, in case that four beams 520, 530, 540, and 550 are selected and used for transmission of the CSI-RS in the beam management procedure 510, a beam management update procedure for selecting and adjusting two beams 520 and 540 through a beam quality reporting from the terminal may be performed. That is, the beams 520 and 540 may be selected (i.e., CSI-RS resources 1 and 3 are selected) and adjusted through the beam quality reporting among the four beams that are managed in the beam management procedure.

Then, the base station may select and adjust two beams 570-1 and 570-2 or two beams 580-1 and 580-2 among four beams ($K_C$=4) for CSI acquisition, and transmit the CSI-RS in the CSI acquisition procedure (S560). Through this procedure, the base station may select and adjust the beams for CSI-RS transmission so as to receive a more detailed CSI from the terminal.

In an embodiment of the present disclosure shown in FIG. 5, when the first beam (the beam transmitted through the CSI-RS resource 1) is assumed to be selected in the beam management procedure and the number of antenna ports of the corresponding CSI-RS resource 1 is assumed to be $P_1$, the number of antenna ports of the CSI-RS for CSI acquisition related to the beam management procedure may be $P_{11}, P_{12}, \ldots,$ and $P_{1n}$. Here, $P_1 \geq P_{11}+P_{12}+ \ldots P_{1n}$.

That is, the number of antenna ports of the CSI-RS resource used in the beam management procedure may be equal to or greater than the number of antenna ports of the CSI-RS resource required for CSI acquisition.

For example, if the beam 1, which is transmitted through $P_1$ CSI-RS antenna ports corresponding to the CSI-RS resource 1, is selected in the beam management procedure, the beam 1 may be adjusted to beam$_{11}$, beam$_{12}, \ldots,$ beam$_{1n}$. The beam$_{11}$ may be a beam of the CSI acquisition procedure, which is transmitted through $P_{11}$ CSI-RS antenna ports corresponding to the CSI-RS resource 1, and the beam$_{12}$ may be a beam of the CSI acquisition procedure, which is transmitted through $P_{12}$ CSI-RS antenna ports corresponding to the CSI-RS resource 2. For convenience of explanation, the number n of antenna ports of the CSI-RS for CSI acquisition is assumed to be 2.

Also, in the embodiment of the present disclosure shown in FIG. 5, when the fourth beam (the beam transmitted through the CSI-RS resource 4) is assumed to be selected in the beam management procedure and the number of antenna ports of the corresponding CSI-RS resource 4 is assumed to be $P_4$, the number of antenna ports of the CSI-RS for CSI acquisition related to the beam management procedure may be $P_{41}, P_{42}, \ldots,$ and $P_{4n}$. Here, $P_4 \geq P_{41}+P_{42}+ \ldots +P_{4n}$.

For example, if the beam 4, which is transmitted through $P_4$ CSI-RS antenna ports corresponding to the CSI-RS resource 4, is selected in the beam management procedure, the beam 4 may be adjusted to beam$_{41}$, beam$_{42}, \ldots,$ Beam$_{4n}$. The beam$_{41}$ may be a beam of the CSI acquisition procedure, which is transmitted through $P_{41}$ CSI-RS antenna ports corresponding to the CSI-RS resource 1, and the beam$_{42}$ may be a beam of the CSI acquisition procedure, which is transmitted through $P_{42}$ CSI-RS antenna ports corresponding to the CSI-RS resource 2. For convenience of explanation, the number n of antenna ports of the CSI-RS for CSI acquisition is assumed to be 2. Meanwhile, as described above, the CSI-RS configuration for the beam management procedure and the CSI-RS configuration for the CSI acquisition procedure may be different.

The base station may transmit the CSI-RS for CSI acquisition configured through the above procedure to the terminal through the beam 1 and the beam 4, and the terminal may receive the CSI-RS and derive CSI and transmit the CSI to the base station. Here, in the embodiment of the present disclosure shown in FIG. 5, four beams are selected in the beam management procedure, and beam 1 and beam 3 are selected as the beams for CSI acquisition through beam quality report, but embodiments of the present disclosure are not limited thereto. That is, the number of beams selected in the beam management procedure and the method of selection beams for CSI acquisition may be changed variously. Next, operation cycles of the beam management procedure and the CSI acquisition procedure will be described.

Figure 6:
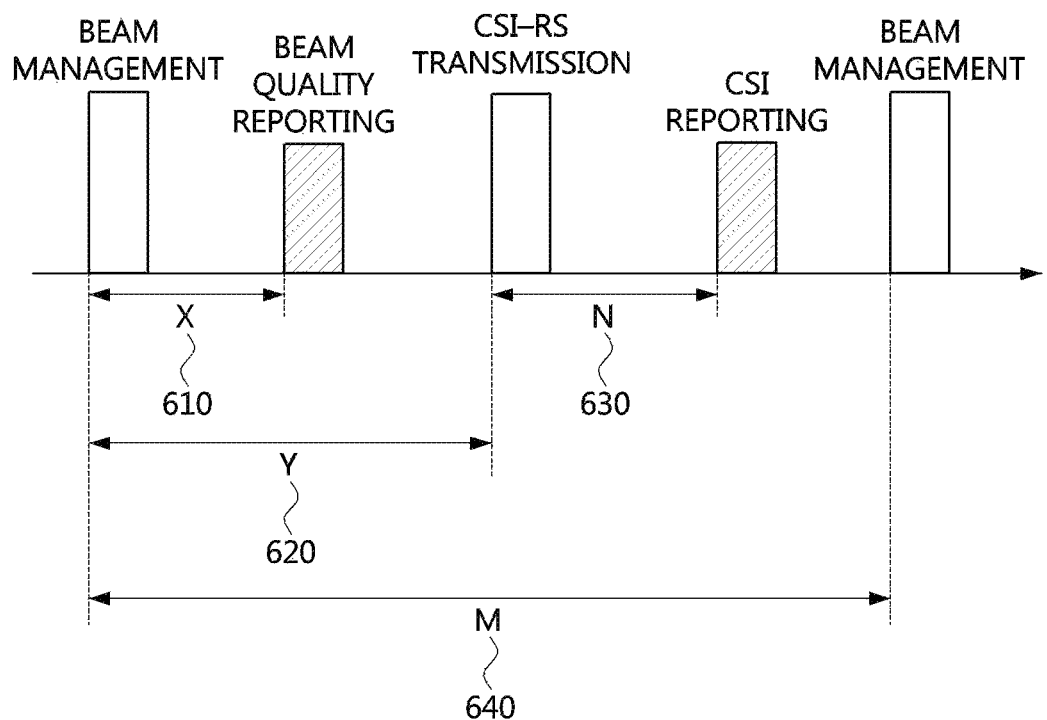
FIG. 6 is a conceptual diagram illustrating a cycle of performing a beam management procedure and a cycle of performing a CSI acquisition procedure according to an embodiment of the present disclosure.

FIG. 6 is a conceptual diagram illustrating a cycle of performing a beam management procedure and a cycle of performing a CSI acquisition procedure according to an embodiment of the present disclosure.

Referring to FIG. 6, the beam management procedure and the CSI acquisition procedure may be periodic, aperiodic, or semi-persistent. For example, for a case that the beam management procedure and the CSI acquisition procedure are periodically performed, the following conditions may be satisfied. A period M 640 at which the beam management procedure is performed may be greater than a sum of an offset Y 620 between the beam management procedure and the transmission of the CSI-RS for CSI acquisition and an offset N 630 between the transmission of the CSI-RS for CSI acquisition and the CSI reporting from the terminal. That is, Y+N<M. In this case, an offset X 610 between the beam management procedure and the reception of the beam quality report from the terminal may be less than the offset Y 620 between the beam management procedure and the transmission of the CSI-RS for CSI acquisition. That is, X<Y.

The configuration information for the cycles for performing the beam management procedure and the CSI acquisition procedure may be transmitted to the terminal through a radio resource control (RRC) signaling, a medium access control (MAC) control element (CE), and a downlink control information (DCI). Next, a description will be given of a method of increasing the efficiency in the interoperation with the beam management procedure by performing the CSI acquisition procedure in multiple stages.

Figure 7A:
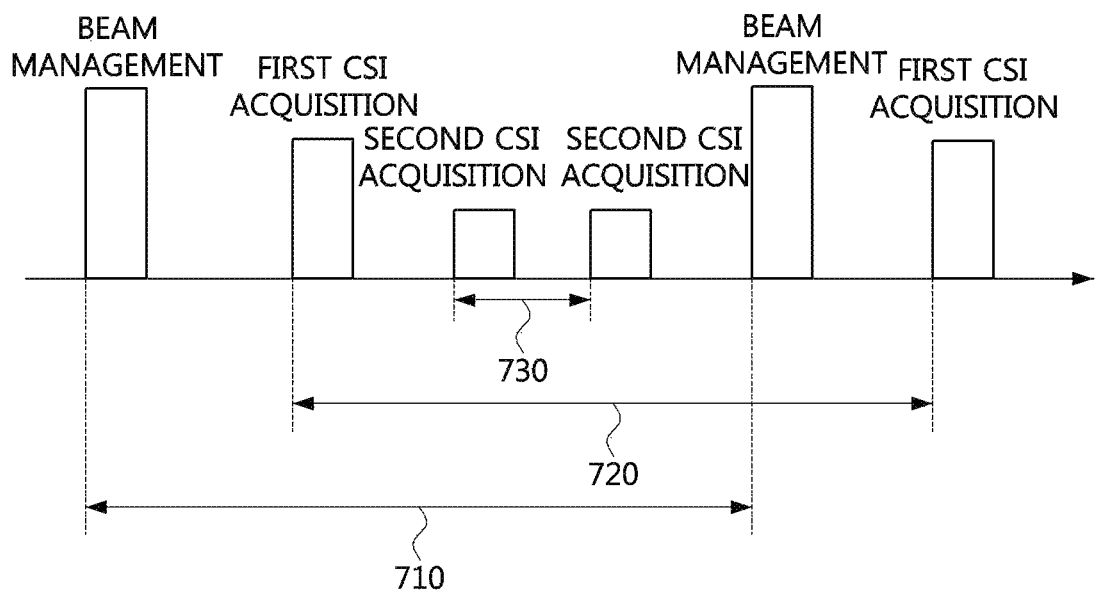
FIG. 7A is a conceptual diagram illustrating a beam management procedure and a multi-stage CSI acquisition procedure according to an embodiment of the present disclosure.
Figure 7B:
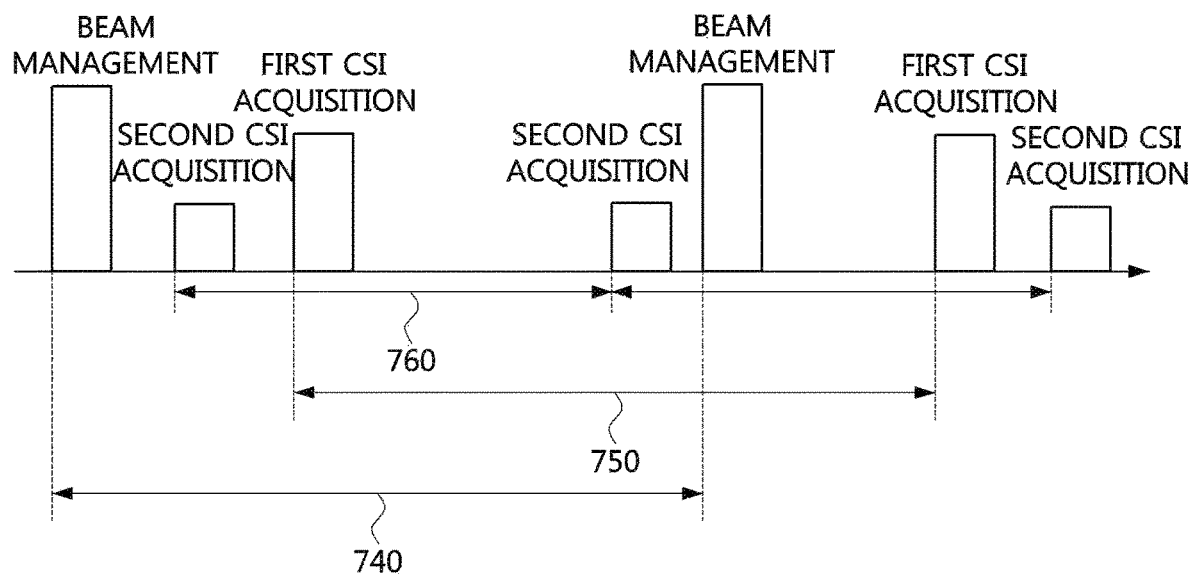
FIG. 7B is a conceptual diagram illustrating a beam management procedure and a multi-stage CSI acquisition procedure according to another embodiment of the present disclosure.

FIG. 7A is a conceptual diagram illustrating a beam management procedure and a multi-stage CSI acquisition procedure according to an embodiment of the present disclosure, and FIG. 7B is a conceptual diagram illustrating a beam management procedure and a multi-stage CSI acquisition procedure according to another embodiment of the present disclosure.

Referring to FIGS. 7A and 7B, the beam management procedure and the CSI acquisition procedure associated with the beam management procedure, which is performed in two or more stages (e.g., two stages), may be illustrated. The cycles of performing the beam management procedure and the two-stage CSI acquisition procedure may be variously set. The two-stage CSI acquisition procedure and the beam management procedure may be configured to operate variously. That is, the beam management procedure and the multi-stage CSI acquisition procedure (comprising, e.g., a first CSI acquisition procedure and a second CSI acquisition procedure) may be configured to operate periodically, aperiodically or semi-persistently.

At this time, configuration information of the second CSI acquisition procedure may dependent on configuration information of the beam management procedure associated with the first CSI acquisition procedure or the first CSI acquisition procedure. For example, in case that the beam management procedure and the first CSI acquisition procedure are configured to operate non-periodically, the second CSI acquisition procedure cannot be configured to operate periodically, and should be configured to operate non-periodically. As another example, in case that the beam management procedure and the first CSI acquisition procedure are configured to operate periodically, the second CSI acquisition procedure cannot be configured to operate non-periodically, and should be configured to operate periodically. The configuration information for the cycle for performing the beam management procedure and the CSI acquisition procedure may be transmitted to the terminal through RRC signaling, MAC CE, and DCI.

According to embodiments of the present disclosure illustrated in FIGS. 7A and 7B, the beam management procedure may be performed according to a predetermined cycle TB (e.g., 710 or 740) and the CSI acquisition procedure may be divided into two stages. For example, the CSI acquisition procedure may be divided into a first CSI acquisition procedure and a second CSI acquisition procedure. Also, each of the first and second CSI acquisition procedures may be performed according to a predetermined cycle for each. For example, the cycle of the first CSI acquisition procedure may be configured to be TC1 (e.g., 720 or 750), and the cycle of the second CSI acquisition procedure may be configured to be TC2 (e.g., 730 or 760).

In the embodiment of FIG. 7A, illustrated is a case that TC1 is longer than TC2. For example, the cycle TB 710 of the beam management procedure may be similar to the cycle TC1 720 of the first CSI acquisition procedure, and the cycle TC2 730 of the second CSI acquisition procedure may be shorter than the cycle TC1 720 of the first CSI acquisition procedure. That is, TB☐TC1>TC2.

In the second CSI acquisition procedure, a CSI-RS used in the first CSI acquisition procedure may be used, or a newly configured CSI-RS may be used. In the case that the two-stage CSI acquisition procedure is used, a long-term CSI may be acquired through the first CSI acquisition procedure, and a further precise short-term CSI may be acquired through the second CSI acquisition procedure, so that scheduling for data transmission can be performed based on the acquired CSIs.

In another embodiment of FIG. 7B, when the CSI acquisition procedure includes the first CSI acquisition procedure and the second CSI acquisition procedure, each of which has a different cycle, the second CSI acquisition procedure may be performed prior to the first CSI acquisition procedure.

For example, the cycle TB 740 of the beam management procedure may be similar to the cycle TC1 750 of the first CSI acquisition procedure, and the cycle TC2 760 of the second CSI acquisition procedure may be shorter than the cycle TC1 750 of the first CSI acquisition procedure. That is, TB≈TC1>TC2. Meanwhile, the CSI acquisition procedure may include two or more CSI acquisition procedures that are dependent on the first CSI acquisition procedure.

As described above, the configuration information for the cycles for performing the beam management procedure and the CSI acquisition procedure may be transmitted to the terminal through RRC signaling, MAC CE, and DCI. Although the embodiments of the present disclosure have been described in terms of downlink, the present disclosure may be also applicable to uplink. Next, a description will be made of an interoperation procedure of the beam management procedure and the CSI acquisition procedure in uplink according to an embodiment of the present disclosure.

Figure 8:
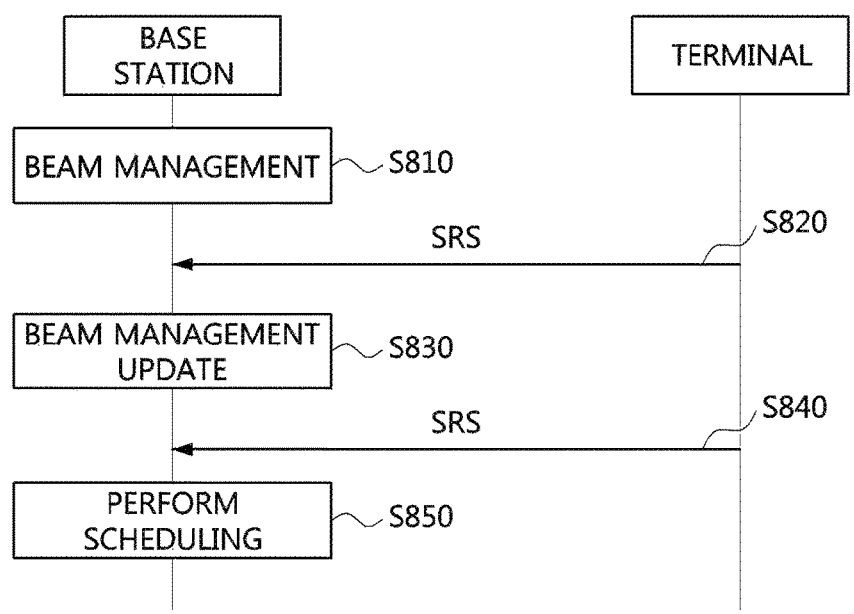
FIG. 8 is a flowchart illustrating an interoperation procedure of a beam management procedure and a CSI acquisition procedure in uplink according to an embodiment of the present disclosure.

FIG. 8 is a flowchart illustrating an interoperation procedure of a beam management procedure and a CSI acquisition procedure in uplink according to an embodiment of the present disclosure.

Referring to FIG. 8, it is illustrated that a beam management procedure and a CSI acquisition procedure are interoperated between a base station and a terminal by using surrounding reference signal (SRS) information from the terminal. When the base station determines that it has not normally received uplink data from the terminal, the base station may instruct the terminal to perform a beam management through a downlink control channel. Specifically, the procedure may be as follows.

The base station may perform a beam management to select and adjust one or more transmission beams and one or more reception beams (hereinafter, referred to as 'multiple beams') that form a radio link with the terminal (S810).

According to the beam management procedure, the terminal may a beam-formed SRS to the base station through beamforming (S820).

Then, the base station may measure uplink beam quality by receiving the SRS from the terminal, and perform a beam management update procedure based on the uplink beam quality measured based on the received SRS (S830). The base station may inform the terminal of beam information updated through the beam management update procedure, and the terminal may transmit a beam-formed SRS for channel estimation using the updated beam information to the base station (S840). The base station may estimate uplink CSI by receiving the SRS for channel estimation from the terminal. Thereafter, the base station may perform scheduling for uplink data transmission (S850).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in a mobile communication system, the operation method comprising:
    performing a beam management procedure for selecting at least one beam and transmitting a different channel state information reference signal (CSI-RS) for each beam to a terminal through the at least one beam;
    receiving beam quality information for the at least one beam from the terminal;
    transmitting at least one CSI-RS for CSI acquisition configured according a beam management update procedure based on the beam quality information to the terminal through the at least one beam; and
    receiving channel state information (CSI) based on the CSI-RS for CSI acquisition from the terminal.

2. The operation method according to claim 1, further comprising performing scheduling for transmission of data to the terminal based on the CSI.

3. The operation method according to claim 1, wherein at least one of a signal pattern of the at least one CSI-RS, a number of resources for the at least one CSI-RS, and information on at least one antenna port per CSI-RS resource is configured through higher layer control information of the base station.

4. The operation method according to claim 1, wherein each of the at least one beam is a cell-specific beam or a user equipment (UE) specific beam.

5. The operation method according to claim 1, wherein the beam quality information includes at least one of a CSI-RS resource indicator (CRI), a precoding matrix indicator (PMI), a rank indicator (RI), a channel quality indicator (CQI), or a reference signal received power (RSRP) for the at least one CSI-RS.

6. The operation method according to claim 1, wherein a number of antenna ports used for a CSI-RS resource used in the beam management procedure is equal to or greater than a number of antenna ports used for a CSI-RS resource used for the CSI acquisition.

7. The operation method according to claim 1, further comprising transmitting a spatial quasi-co-location (QCL) information to the terminal, when the CSI-RS of the beam management procedure and the CSI-RS for CSI acquisition have a same spatial characteristic.

8. The operation method according to claim 1, wherein the performing of the beam management procedure and the receiving of the CSI are performed in one of a periodical manner, a non-periodical manner, or a semi-persistent manner.

9. The operation method according to claim 8, wherein the receiving of the CSI comprises a first CSI acquisition procedure and a second CSI acquisition procedure, each of which is performed according to a same cycle or according to a different cycle.

10. The operation method according to claim 1, wherein the CSI includes at least one of a rank indicator (RI), a precoder matrix indicator (PMI), or a channel-quality indicator (CQI).

11. An operation method of a terminal in a mobile communication system, the operation method comprising:
    receiving at least one channel state information reference signal (CSI-RS) from a base station through at least one beam selected through a beam management procedure of the base station;
    transmitting to the base station beam quality information based on the at least one CSI-RS received from the base station;
    receiving from the base station at least one CSI-RS for CSI acquisition configured based on the beam quality information; and
    transmitting channel state information (CSI) based on the at least one CSI-RS for CSI acquisition to the base station;
    wherein a number of antenna ports used by a CSI-RS resource used in the beam management procedure is equal to or greater than a number of antenna ports used by a CSI-RS resource used for the CSI acquisition.

12. The operation method according to claim 11, wherein at least one of a signal pattern of the at least one CSI-RS, a number of resources for the at least one CSI-RS, and information on at least one antenna port per CSI-RS resource is configured through higher layer control information of the base station.

13. The operation method according to claim 11, wherein the beam quality information includes at least one of a CSI-RS resource indicator (CRI), a precoding matrix indicator (PMI), a rank indicator (RI), a channel quality indicator (CQI), or a reference signal received power (RSRP) for the at least one CSI-RS.

14. The operation method according to claim 11, wherein the CSI includes at least one of a rank indicator (RI), a precoder matrix indicator (PMI), or a channel-quality indicator (CQI).

15. A terminal in a mobile communication system, the terminal comprising at least one processor, a memory storing at least one instruction executable by the at least one processor, and a transceiver controlled by the at least one processor, wherein the at least one instruction is configured to, when executed by the at least one processor:
    receive, by using the transceiver, at least one channel state information reference signal (CSI-RS) from a base station through at least one beam selected through a beam management procedure of the base station;
    transmit, by using the transceiver, to the base station beam quality information based on the at least one CSI-RS received from the base station;
    receive, by using the transceiver, from the base station at least one CSI-RS for CSI acquisition configured based on the beam quality information; and
    transmit, by using the transceiver, channel state information (CSI) based on the at least one CSI-RS for CSI acquisition to the base station;
    wherein a number of antenna ports used for a CSI-RS resource used in the beam management procedure is equal to or greater than a number of antenna ports used for a CSI-RS resource used for the CSI acquisition.

16. The terminal according to claim 15, wherein at least one of a signal pattern of the at least one CSI-RS, a number of resources for the at least one CSI-RS, and information on at least one antenna port per CSI-RS resource is configured through higher layer control information of the base station.

17. The terminal according to claim 15, wherein the beam quality information includes at least one of a CSI-RS resource indicator (CRI), a precoding matrix indicator (PMI), a rank indicator (RI), a channel quality indicator (CQI), or a reference signal received power (RSRP) for the at least one CSI-RS.

18. The terminal according to claim 15, wherein the CSI includes at least one of a rank indicator (RI), a precoder matrix indicator (PMI), or a channel-quality indicator (CQI).

* * * * *